(12) United States Patent
Cholhan et al.

(10) Patent No.: US 10,957,183 B2
(45) Date of Patent: Mar. 23, 2021

(54) EMERGENCY NOTIFICATION APPARATUS AND METHOD

(71) Applicant: CHOPRIX LLC, Rochester, NY (US)

(72) Inventors: Hilary J. Cholhan, Rochester, NY (US); Remy Cholhan, Rochester, NY (US)

(73) Assignee: CHOPRIX LLC, Rochester, NY (US)

(*) Notice: Subject to any disclaimer, the term of this patent is extended or adjusted under 35 U.S.C. 154(b) by 0 days.

(21) Appl. No.: 16/556,821

(22) Filed: Aug. 30, 2019

(65) Prior Publication Data

US 2019/0385438 A1 Dec. 19, 2019

Related U.S. Application Data

(63) Continuation of application No. PCT/US2018/020699, filed on Mar. 2, 2018.
(Continued)

(51) Int. Cl.
*H04B 1/38* (2015.01)
*G08B 25/01* (2006.01)
(Continued)

(52) U.S. Cl.
CPC ......... *G08B 25/016* (2013.01); *G08B 21/043* (2013.01); *G08B 21/0415* (2013.01); *G08B 21/0461* (2013.01); *G08B 25/001* (2013.01)

(58) Field of Classification Search
CPC .......................... G08B 25/016; G08B 21/0415; G08B 21/043; G08B 21/0461; G08B 25/001
(Continued)

(56) References Cited

U.S. PATENT DOCUMENTS 5,200,736 A * 4/1993 Coombs ................. G01K 3/005
 2/5
6,889,942 B2 * 5/2005 Preston ................... B64D 17/74
 244/152
(Continued)

FOREIGN PATENT DOCUMENTS

DE 29503057 U1 4/1995
WO 2010051287 A1 5/2010
WO 2013076325 A1 5/2013

OTHER PUBLICATIONS

International Search Report and Written Opinion of the International Searching Authority for International Application No. PCT/US2018/020699 dated May 2, 2018.
(Continued)

*Primary Examiner* — April G Gonzales
(74) *Attorney, Agent, or Firm* — Heslin Rothenberg Farley & Mesiti P.C.

(57) ABSTRACT

A wearable emergency alert apparatus, which includes a processor, obtains data from a portion of the plurality of sensors. The apparatus determines that an emergency condition has occurred, based on either comparing the data to one or more pre-defined thresholds and determining that the data indicates an emergency condition or receiving specific input via the user input device. Based on the determining the emergency condition has occurred, the apparatus obtains location information from the location device and transmits a notification that includes the location information, via a network connection, by utilizing the communication device.

19 Claims, 8 Drawing Sheets

Related U.S. Application Data

(60) Provisional application No. 62/466,441, filed on Mar. 3, 2017.

(51) Int. Cl.
  *G08B 21/04* (2006.01)
  *G08B 25/00* (2006.01)

(58) Field of Classification Search
  USPC .......................................................... 455/90.1
  See application file for complete search history.

(56) References Cited

U.S. PATENT DOCUMENTS

| | | | | |
|---|---|---|---|---|
| 6,960,996 | B2* | 11/2005 | Sackl | A63B 29/021 340/539.11 |
| 8,604,925 | B2* | 12/2013 | Monte | G01S 5/0027 340/539.13 |
| 2003/0197095 | A1* | 10/2003 | Preston | B64D 17/04 244/152 |
| 2004/0130446 | A1* | 7/2004 | Chen | G16H 40/67 340/539.12 |
| 2005/0219950 | A1* | 10/2005 | Rowe | G01S 5/0226 367/118 |
| 2006/0148423 | A1* | 7/2006 | Sharpe | G08B 25/001 455/90.1 |
| 2007/0177651 | A1* | 8/2007 | Daugherty | A63B 71/10 374/163 |
| 2008/0129518 | A1* | 6/2008 | Carlton-Foss | G08B 25/10 340/573.1 |
| 2009/0182207 | A1* | 7/2009 | Riskey | A61B 5/4238 600/302 |
| 2009/0322513 | A1* | 12/2009 | Hwang | G06F 19/3418 340/539.12 |
| 2010/0227585 | A1* | 9/2010 | Carroll | H04M 11/04 455/404.2 |
| 2010/0295684 | A1* | 11/2010 | Hsieh | A61B 5/002 340/573.1 |
| 2011/0298613 | A1* | 12/2011 | Ben Ayed | A61B 5/7415 340/539.11 |
| 2012/0136923 | A1* | 5/2012 | Grube | H04W 4/90 709/203 |
| 2012/0265477 | A1* | 10/2012 | Vock | G01S 19/00 702/130 |
| 2012/0286933 | A1* | 11/2012 | Hsiao | G06Q 10/0833 340/8.1 |
| 2013/0016449 | A1* | 1/2013 | Crandall | F41H 13/0018 361/232 |
| 2013/0060168 | A1* | 3/2013 | Chu | A61B 5/6803 600/595 |
| 2013/0278416 | A1* | 10/2013 | Button | G01S 5/0072 340/539.13 |
| 2014/0292510 | A1* | 10/2014 | Cholhan | H04W 4/021 340/539.13 |
| 2015/0065082 | A1* | 3/2015 | Sehgal | G08B 25/016 455/404.2 |
| 2015/0256990 | A1* | 9/2015 | Vilrokx | H04W 76/50 455/404.1 |
| 2017/0018169 | A1* | 1/2017 | Cholhan | H04W 4/021 |

OTHER PUBLICATIONS

International Search Report and Written Opinion of the International Searching Authority for International Application No. PCT/US2015/052065 dated Feb. 1, 2016.

International Search Report and Written Opinion of the International Searching Authority for International Application No. PCT/US2014/054210 dated May 19, 2015.

International Preliminary Report on Patentability for International Application No. PCT/US2018/020699, dated Sep. 3, 2019, 8 pages, International Bureau of WIPO.

\* cited by examiner

EMERGENCY NOTIFICATION APPARATUS AND METHOD

CROSS REFERENCE TO RELATED APPLICATIONS

This application is a U.S. Continuation of International Application No. PCT/US2018/020699 filed on Mar. 2, 2018, which claimed priority from U.S. provisional application No. 62/466,441 filed Mar. 3, 2017, entitled "Wearable Emergency Notification Apparatus and Method of Use," and is also a continuation-in-part of U.S. Patent Non-provisional application Ser. No. 15/062,948, filed Mar. 3, 2016, entitled "Emergency Notification Apparatus and Method," which is a continuation of U.S. Patent Non-provisional application Ser. No. 14/227,493, filed Mar. 27, 2014, entitled "Emergency Notification Apparatus," which claims priority from U.S. provisional patent application No. 61/805,573, filed Mar. 27, 2013, entitled, "Avalanche Ready (AVR) System," which are all hereby incorporated herein by reference in their entirety.

FIELD OF INVENTION

Embodiments of the present invention relate generally to an apparatus and method to alert emergency services personnel to a need for assistance. The system can be configured for use in geographic regions that are sparsely populated that feature uneven terrain as well as in densely populated urban environments, and/or outdoor recreation areas.

BACKGROUND OF INVENTION

Many pastimes can require individuals to explore isolated terrain, thus leaving these individuals stranded in the event of an unforeseen emergency, such as a medical emergency and/or weather-related hazard. For example, in the winter, many outdoor sports come with the risk of the participant being injured and possibly stranded in calamitous events (e.g., avalanches).

In fact, millions of people throughout the world enjoy outdoor activities that expose them to the perils of snow-related accidents. Every year many avid outdoor sportsmen and women are victimized by snow-related disasters associated with unanticipated avalanches. Although great efforts are dedicated toward pre-emptive control of potential avalanches, backcountry and on-piste skiers, off-piste skiers, snowboarders, snowshoers, mountaineers, hikers and snowmobilers fall victim to the perils of being buried by avalanches.

In most cases, there are precious minutes available to the timely location and rescue of avalanche victims, particularly when they are incapacitated physically by being buried and unable to move or breathe or rendered unconscious. Timely search and rescue of avalanche victims is essential if lives are to be saved.

A disadvantage of present systems and methods is that they are only operational if the person with the emergency device, for example, the position-indicating radio beacon (EPIRB), is conscious and is physically able to activate the device.

In addition to well-trained and equipped and experienced search-and-rescue teams, present methods of avalanche rescue utilize a multi-faceted approach, and sometimes combine known methods, which include avalanche cords, beacons, probes, shovels, and the RECCO rescue system. The RECCO system is a two-part system, which includes a rescue team with hand-held devices, which detect "reflectors," which are small passive transponders, which can be affixed to outerwear, boots, helmets and other types of body-protection components of individuals.

Another search tool that is utilized often in conjunction with RECCO, is avalanche beacons. In use since 2000, avalanche beacons are devices worn by individuals who activate a radio signal indicating an emergency. The radio-emitting beacon is picked up by rescue transceivers, using a digital display, thus helping to locate the victim within a reasonably tight range of location. However, this system requires that the victim be conscious and physically capable of activating the beacon-emitting signal apparatus.

A challenge of present methods is that they are not integrated into a single solution. Thus, many adventurers utilize a variety of different tools at once, in the hopes that one works in the event of an emergency. In fact, in 2010, the French National Association for the Study of Snow and Avalanches (ANENA) recommended that all off-piste skiers should carry beacons, probes, shovels and RECCO reflectors. In addition to this recommendation, many backcountry adventurers also carry: SPOT satellite GPS messengers, Mountain Locator Units (MLU), Personal Locator Beacons (PLB) and Globalstars.

Many outdoor sports, recreations and pastimes pose inherent risks and dangers. As it relates to snow sports participation (e.g., alpine skiing, snowboarding, etc.), the three primary modes of notifying emergency response personnel (e.g., ski patrol) are highly inefficient and unreliable, causing unnecessary and potentially deadly delays. The three common modes of notifying ski patrol include the use of cellular/smartphones, smartphone applications and/or relying on vigilant bystanders who witness an incident and then transmit the incident information to others who, in turn, eventually communicate that information to ski patrol. Each of these modes is problematic for ensuring a fast response to issues. Firstly, cellular phones/smartphones and their signals/service are not reliable in all outdoor environments (e.g., extreme temperatures, forested terrain, mountains, etc.). Secondly, smartphone applications are inefficient because they do not notify emergency response personnel directly, but rather, only emergency contacts the user designates who, in turn, have the option to notify emergency response personnel of the incident. Additionally, many current cellphones can suffer from service interruptions based on mechanical issues or other instances, such as extreme weather, which is common in outdoor sports environments. Lastly, the human chain of communication often results in inaccurate information being transmitted to ski patrol, delaying their response time, leaving a victim stranded and vulnerable.

SUMMARY OF INVENTION

Shortcomings of the prior art are overcome and additional advantages are provided through the provision of a wearable emergency alert apparatus for alerting an emergency responder to an emergency, the apparatus includes: a wearable emergency alert apparatus, comprising: a memory; a processor in communication with the memory; a user input device in communication with the processor; a plurality of sensors in communication with the processor; a location device in communication with the processor; a communication device in communication with the processor, wherein the wearable emergency alert apparatus is configured to perform a method, the method comprising: obtaining, by the processor, data from a portion of the plurality of sensors; determining, by the processor, that an emergency condition has occurred, wherein the determining is based on a circumstance selected from the group consisting of: comparing the data to one or more pre-defined thresholds and determining that the data indicates an emergency condition and receiving specific input via the user input device; based on the determining the emergency condition has occurred, obtaining, by the processor, location information from the location device; and transmitting, by the processor, a notification comprising the location information, via a network connection, by utilizing the communication device.

Shortcomings of the prior art are overcome and additional advantages are provided through the provision of a wearable emergency alert apparatus for alerting an emergency responder to an emergency, the apparatus includes: a wearable emergency alert apparatus, comprising: a memory; a processor in communication with the memory; a user input device in communication with the processor; a plurality of sensors in communication with the processor; a location device in communication with the processor; a communication device in communication with the processor, wherein the wearable emergency alert apparatus is configured to perform a method, the method comprising: obtaining, by the processor, data from a first portion of the plurality of sensors; determining, by the processor, that an emergency condition has occurred, wherein the determining is based on a circumstance selected from the group consisting of: applying business rules stored in the memory to the data and determining that the data indicates an emergency condition and receiving specific input via the user input device; based on the determining the emergency condition has occurred, obtaining, by the processor, location information from the location device; queuing, by the processor, a notification to be sent over a network to a client of an emergency response system, via the communication device, wherein the notification comprises the location information; obtaining, by the processor, additional data from a second portion of the plurality of sensors; determining, by the processor, based on the additional data, that the wearable emergency alert apparatus is not in motion; based on determining that the wearable emergency alert apparatus is not in motion, commencing monitoring the user input device during a predetermined period of time to determine if a specific input is received by the input device during the predetermined period of time; based on determining that the specific input is received during the predetermined period of time, cancelling the queued notification; and based on determining that the specific input is not received during the predetermined period of time, transmitting the queued notification.

Computer systems, computer program products, wearable objects, and methods relating to one or more aspects of the technique are also described and may be claimed herein. Further, services relating to one or more aspects of the technique are also described and may be claimed herein.

Additional features are realized through the techniques of the present invention. Other embodiments and aspects of the invention are described in detail herein and are considered a part of the claimed invention.

BRIEF DESCRIPTION OF DRAWINGS

The foregoing and objects, features, and advantages of one or more aspects of the invention are apparent from the following detailed description taken in conjunction with the accompanying drawings in which.

DETAILED DESCRIPTION OF THE INVENTION

Figure 1:
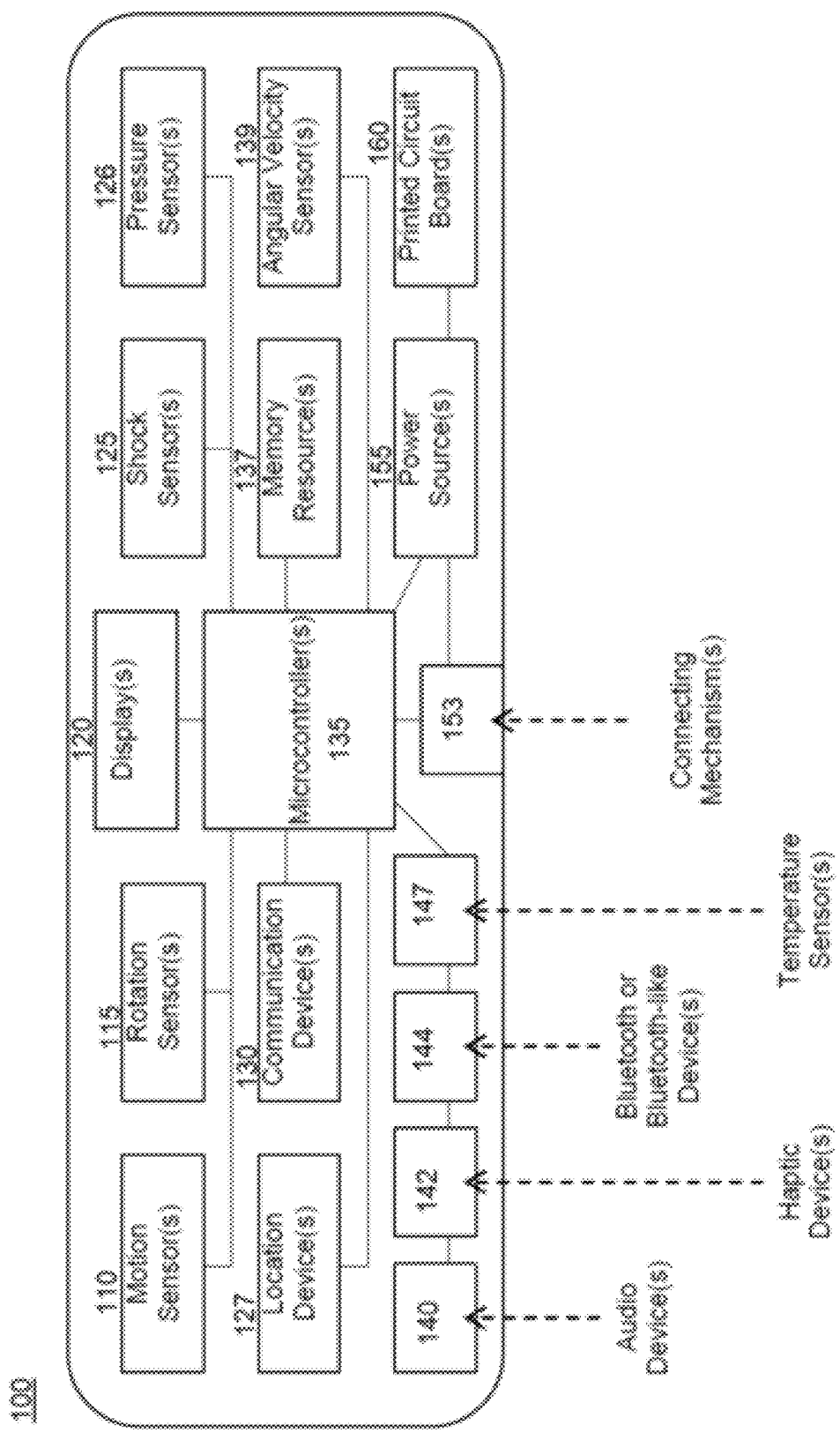
FIG. 1 is an embodiment of a sensory unit which is integrated into embodiments of the present invention.

Aspects of the present invention and certain features, advantages, and details thereof, are explained more fully below with reference to the non-limiting examples illustrated in the accompanying drawings. Descriptions of well-known materials, fabrication tools, processing techniques, etc., are omitted so as not to unnecessarily obscure the invention in detail. It should be understood, however, that the detailed description and the specific examples, while indicating aspects of the invention, are given by way of illustration only, and not by way of limitation. Various substitutions, modifications, additions, and/or arrangements, within the spirit and/or scope of the underlying inventive concepts will be apparent to those skilled in the art from this disclosure.

Current modes of notifying emergency response personnel for outdoor sports, recreations and pastimes are inefficient, unreliable, and potentially deadly. Embodiments of the present invention include a wearable emergency notification apparatus that enables victims to alert emergency rescue personnel, and in this alert, provide their geographic locations (and optionally identifying information), whenever these individuals are in need of immediate medical/evacuative assistance from the emergency personnel. Embodiments of the present invention can be configured for use in geographic regions that are sparsely populated that feature uneven terrain as well as densely populated urban environments, and/or outdoor recreation areas. Embodiments of the present invention can be utilized with the emergency notification system disclosed in of U.S. Patent Non-provisional application Ser. No. 14/227,493, which, as aforementioned, is incorporated herein in its entirety for all purposes. Embodiments of the present invention may also be configured for use with various off-the-shelf emergency response systems. Various apparatuses that comprise embodiments of the present invention may provide a method of providing an alert to a given emergency response system with location information and, optionally, additional identifying details.

Embodiments of the present invention enable individuals who are in distress, but may or may not be conscious, to alert emergency response personnel of their needs for assistance. Although the present invention can be utilized in emergency response situations beyond avalanche-related emergencies, this situation is referenced throughout the application as a possible scenario in which embodiments of the present invention may be utilized and are effective in providing swift emergency response.

Embodiments of the present invention can be activated automatically to alert search and rescue personnel to the precise location of the victim using a current global positioning system (GPS) or similar technology.

Embodiments of the present invention include a wearable apparatus and/or components that can be integrated into a wearable apparatus (i.e., such that the one or more components can be detached and attached) that comprise an emergency alert system. A wearable emergency notification apparatus enables the wearer to alert emergency response personnel (e.g., ski patrol) when the wearer has encountered a severe accident or emergent incident (e.g., chest pain) and is in need of immediate medical/evacuative assistance.

A wearable apparatus (or one or more components that can be integrated into a wearable apparatus) of some embodiments of the present invention includes, but is not limited to, the following components: a microcontroller, a power source, a display, a communication device, a memory/storage resource, a location device, one or more temperature sensors, one or more biometric and/or physiological sensors, one or more heart rate sensors, one or more motion sensors, one or more rotation sensors, one or more angular velocity sensors, one or more shock sensors, one or more pressure sensors, and/or an identification device. In embodiments of the present invention where the components of the apparatus are detachably connected to a wearable item, embodiments of the present invention also include a connecting mechanism.

A wearable apparatus (whether the components are detachable or integrated) of the present invention includes one or more programs that are executed on at least one processing device, including but not limited to the aforementioned microcontroller. The one or more programs determine the presence of a problematic situation (e.g., an accident, hazardous conditions), obtain data to assist in any mitigation effort (e.g., location information, identification information), and send the obtained data to an emergency notification system (e.g., the emergency notification system disclosed in U.S. Patent Non-provisional application Ser. No. 14/227,493).

In order for the one or more programs to function in the manner described, embodiments of the present invention may include some of the following components and technologies: an on/off push button (to activate and/or deactivate the apparatus), and emergency alert push button (that a wearer can manually depress to trigger an alert received by the one or more programs over a wired or wireless connection), accident detection/sensing technologies (e.g., one or more of: accelerometers, shock sensors, pressure sensors, motion sensors, angular velocity sensors, rotation sensors, etc., which can sense a problematic situation automatically and when triggered based on pre-defined conditions, the one or more programs receive an indication of a problematic situation), location technologies (e.g., GPS module, etc., from which the one or more programs may obtain location information to transmit to the emergency alert system), radio frequency transceiver and/or a radio frequency antenna (to enable the one or more programs to communicate with the emergency alert system), a microprocessor (to execute the one or more programs), storage (e.g., memory, to store identification information, such as a unique identifier, for transmission by the one or more programs to the emergency alert system), a power supply (e.g., lithium-ion battery, etc.), a charging circuit, sensory devices (e.g., audio, haptic, visual interface, to interact with the wearer both to collect and convey data for use by the one or more programs), communication paths or networks (e.g., Bluetooth, wireless technologies, to enable the one or more programs to communicate with various components of the apparatus as well as with an external emergency alert system).

In some embodiments of the present invention, the one or more programs may comprise software and/or hardware programs. For example, embodiments of the present invention may include one or more application-specific integrated circuit (ASIC). The application-specific circuits may be provided on a printed circuit board (PCB) as well as any additional components that allow the user to notify emergency response personnel of their incident and their precise geographic location. All, or any of the above or equivalents with similar functionality may be housed in the sensory unit fastening portion and/or any other portion of the belt/harness arrangement. The components within the device may communicate with each other both wirelessly, via a wired communication network, or via a network and/or connection that utilizes both of these technologies.

FIG. 1 is a system diagram that includes several aspects that can be integrated, both permanently and detachably, into a wearable device, in embodiments of the present invention. The aspects may be referred to as a sensory unit (SU) 100 because these aspects enable one or more programs in embodiments of the present invention to sense a problematic situation and provide a notification to an emergency notification system, so that emergency personnel can be effectively dispatched to address the situation.

As indicated in FIG. 1, the sensory unit 100 may include one or more of the various components. For ease of understanding, only, the components illustrated in FIG. 1 are referred to herein in singular form. The sensory unit 100 includes a microcontroller 135 upon which one of more programs may be executed; the one or more programs receive an indication of a problematic situation/event (an impact or collision, unexpected movement of the wearer, unexpected orientation of the wearer, etc.). The microcontroller 135 is communicatively coupled to various other aspects of the sensory unit 100, enabling the one or more programs to communicate with these aspects. The communications may be wired and/or wireless between the microcontroller 135 and the other aspects. Based on the connectivity, the one or more programs receive this indication from one or more of a variety of active and/or passive sensors in this sensory unit 100.

In some embodiments of the present invention, the one or more programs recognize what constitutes regular motion, within the activity that an individual wearing the sensory unit is participating in. The pre-sets, which may be stored in a memory resource 137, establish a baseline of regular motion, rotation, velocity, orientation, angular velocity, etc., that would be considered regular movement by a wearer participating in a given athletic activity. The one or more programs executing on the microcontroller 135 can therefore recognize when motion, rotation, velocity, angular velocity, etc., of the wearer is outside of an expected baseline, which would indicate a problematic situation. The one or more programs receive (or poll to receive, depending on whether the sensors are active or passive), data from one or more of a motion sensor 110, rotation sensor 115, shock sensor 125, pressure sensor 126, and/or an angular velocity sensor 139, and the one or more programs determine, based on the data received, whether the motion of the wearer of the sensory unit 100 is moving (or recently moved, as the wearer may no longer be in motion) in a manner that is outside the expected baseline. Based on making this determination, the one or more programs utilize a communication device 130 to transmit a request for assistance to an emergency notification system, for example, via a wireless technology, including but not limited to, Bluetooth 144.

In some embodiments of the present invention, the communication device 130 and/or the connecting mechanism 153 may enable the sensory unit 100 to be paired or to communicate with an external computing node, including but not limited to, a smartphone, personal fitness tracker, tablet, etc. This communication may occur over a wired and/or wireless private or public network connection, including but not limited to, the Internet. For example, an individual may be able to utilize a personal computing device to track the location, biometrics, and/or status of a wearer of the sensory unit 100.

The one or more programs may obtain location information from the location device 127 before sending the notification and therefore, may include the location information of the wearer in the notification. Additionally, the one or more programs may obtain identifying information about the wearer or the unit 100 (which can be utilized by an emergency responder to identify the wearer), from the memory 137, and include this information in the notification. The identifying data stored in the memory 137 may be as simple as a unique identifier for the sensory unit and/or detailed personal data, including but not limited to medical data that could assist the emergency personnel in making medical decisions (e.g., allergy information). Because some embodiments of the present invention include biometric sensors and monitors in the sensory unit 100, when the one or more programs transmit a notification, included in the notification may be values from the biometric readings taken by these devices. Additionally, an emergency response worker, upon reaching the user, may connect his or her personal device to the sensory unit 100 in order to check the biometric readings, at the time of rescue.

Embodiments of the present invention may also include various devices that receive input from the wearer, including, but not limited to, an audio device 140, a haptic device 142, the aforementioned Bluetooth or similar device 144, and a temperature sensor 147. The audio device 140, haptic device 142 and temperature sensor 147 provide a way for a wearer to activate (actively or passively) the sensory unit. For example, in some embodiments of the present invention, the one or more programs will activate and/or deactivate the functionality of the sensory unit 100 based on receiving pre-defined input via one or more of the audio device 140, the haptic device 142, and the temperature sensor 147. For example, the wearer may utilize the audio device to enable or disable the device and/or manually request that the one or more programs transmit a notification. The temperature sensor 147 may enable the one or more programs to determine whether to activate or de-activate the sensory unit 100, as it assists the one or more programs in determining whether a user is wearing the sensory device 100. For example, the sensory unit 100 may be enabled by the one or more programs if the temperature sensor 147 indicates a given temperature (e.g., for a given amount of time) and the sensory unit 100 may be deactivated by the one or more programs if the temperature sensor 147 indicates a temperature below a given threshold (e.g., for a given amount of time). In the event that the sensory unit 100 is going to deactivate based on data from the heat sensor 147, the one or more programs may confirm this instruction by providing an alert to the wearer on the display 120 and the user can disable this functionality by providing, within a grace period, a designated instruction, via the audio device 140 and the haptic device 142.

In some embodiments of the present invention, in addition or instead of receiving feedback via the display 120, the user may also receive feedback via one or more of the audio device 140 and the haptic device 142. For example, subsequent to the one or more programs receiving a request to make a notification, from a manual selection, and/or determining that a notification should be made based on analyzing data received from the one or more sensors, the one or more programs may provide feedback to the wearer via these devices, alerting the wearer that a notification will be sent. In embodiments of the present where the one or more programs wait a grace period before sending the alert, upon receiving this feedback, the user may take an action to cancel the alert by providing a response utilizing these input devices.

In some embodiments of the present invention, the one or more programs, subsequent to sending a notification and, optionally, receiving a confirmation from the destination, will provide feedback via one or more of the display 120, the haptic device 142, and/or the audio device 140, to the user to indicate that the notification has been sent and/or received.

The display 120, which may be comprised of one or more light emitting diodes, may provide the user with a visual warning that an automatic notification has been triggered. As will be discussed later, based on this visual alert, the user may utilize various aspects of the sensory unit 100 to override the automatic notification and stop this alert. A user may also utilize the display 120 to determine if a manually triggered alert has been effective. The display can assist a user in timing whether she has depressed the manual alert button for a predefined amount of time sufficient to trigger an alert. In some embodiments of the present invention, the LEDs may form a "countdown" pattern. In some embodiments of the present invention, the display may also indicate to the wearer whether the sensory unit 100 is active.

In an embodiment of the present invention, a connecting mechanism 153 enables an external connection to the sensory unit 100. This connecting mechanism 153 may be utilized to charge a power source or communicate with the sensory unit 100, for example, for diagnostic and maintenance purposes. Certain aspects of the components in the sensory unit 100 may be provided on one or more printed circuit board 160.

In embodiments of the present invention, one or more programs executing on the microcontroller 135 of the sensory unit 100 (which can be part of a wearable apparatus or comprised of various components that can be attached to a wearable apparatus), will transmit a notification to an emergency notification system in one of at least two circumstances: 1) the sensory unit 100 is manually triggered by a user to provide an alert (i.e., via depressing a manual alert button for a predetermined period of time), and/or 2) data received by the one or more programs by one or more of the various sensors indicates a problematic situation, triggering an automatic notification, by the one or more programs.

Regarding the first circumstance, to utilize embodiments of the present invention to trigger a notification manually, a user/wearer may press and hold an emergency push button (of the sensory unit) for a predefined duration of time (e.g., 3 seconds). Upon receiving this input for the pre-defined duration, the one or more programs send the notification, which may include the specific geographic location (obtained via the location device), to emergency response personnel via transmitting the notification to a resource of an emergency notification system.

Regarding the second circumstance, the one or more programs transmit a notification automatically when a user and/or the wearable emergency notification apparatus experiences a violent accident, impact or sudden, rapid change in directional velocity that registers outside the bounds of typical, predetermined, activity-specific thresholds, and/or a change in physical orientation that is outside of defined parameters, an automatic distress signal, including the specific geographic location of the user, can be sent to emergency response personnel. These circumstances are perceived by the sensors and obtained by the one or more programs either automatically (from active sensors), or based on polling the sensors regularly for data (if the sensors are passive). Threshold parameters for issuance of automatic distress signals (i.e., notifications) can be determined based on activity-specific (e.g., alpine skiing, snowboarding, snowmobiling, etc.) behaviors, measurements, physiological parameters, etc. Thus, the parameters that would cause the one or more programs to automatically transmit a notification can be customized based on the wearer and the activity. In some embodiments of the present invention, the sensory unit 100 includes various biometric sensors and the one or more programs transmit a notification based on the biometric data receives being outside of a pre-configured threshold.

As discussed above, the sensory unit 100 may send a notification to an emergency notification system, based on the one or more programs receiving a manually triggered or automatically triggered alert (based on sensor feedback comporting with defined parameters or registering outside of established thresholds). When a manual and/or automatic distress signal is set to go off, i.e., the one or more programs receive data that indicates that a notification should be sent, the one or more programs may provide the user with feedback, including, but not limited to, audio feedback, via the audio device 140, haptic feedback, via the haptic device 142, and/or visual feedback, via the display 120. This feedback indicates that a distress signal has been activated and the one or more programs are about to transmit a notification to emergency response personnel via a transmission to an emergency notification system. In order to prevent false alarms, if the user is conscious and does not require assistance, the user can provide feedback to cancel the alert (via the audio device 140, haptic device 142, and/or another designated input) for a predefined duration of time (e.g., 20 seconds) so that the one or more programs does not transmit the notification. In some embodiments of the present invention, a wearer (i.e., user) may deactivate the emergency response personnel alert by depressing a manual button (that may have initiated the alert) and/or a separate button or input device on the sensory unit 100.

The one or more programs may wait a given period of time before providing an automatic notification, even if the criteria have been met. In some embodiments of the present invention, the one or more programs may wait a short grace period before transmitting the alert/notification. During this grace period (e.g., 1-5 seconds) the one or more programs continue to receive, actively and/or passively, information from one or more of the sensors. Based on the sensor data, if the one or more programs determine that the user has moved a linear distance on the terrain within the predefined duration of time (e.g., the grace period), the one or more programs do not send the notification. This type of movement would indicate that the user/wearer has recovered from the problematic situation. If the grace period lapses, the one or programs transmits the alert because the lapse could indicate, for example, that the user is unconscious. In some embodiments of the present invention, the one or more programs may send the notification after the problematic event is detected/determined based on monitoring the motion of the user (utilizing the various sensors and/or location device) and determining that the user has remained motionless for a given amount of time. Additional modes for preventing false alarms may be incorporated (e.g., heat sensors, fastened sensory unit buckle, etc.), and these elements may be checked by the one or more programs before sending a notification. For example, in some embodiments of the present invention, the sensory unit 100 is located in a buckle and fastening the buckle activates the sensory unit 100 while unfastening the buckle deactivates the sensor unit 100.

Based on the data available to the one or more programs via the location device 127 and the sensors, in the sensory unit 100, the one or more programs can include in a notification, data indicating a user's incident and precise geographic location. In some embodiments of the present invention, identification information of the user is stored in one or more databases accessible to one or more of the emergency alert personnel's computing system (that received alerts) and/or the apparatus (e.g., in a memory resource 137). Thus, based on an alert that includes identification information for the user, for example, a unique identifier of the user (wearer), one or more programs executed by the apparatus (e.g., by the microprocessor) or at a computing node utilized by the emergency personnel, can utilize the unique identifier to access additional information about the user, including but not limited to, pertinent personal health and/or medical information. Access to this additional information enables emergency response personnel to be aware of who the user is and any pertinent health and/or medical conditions the user might have, before the emergency response personnel arrives at the scene of the incident. Alternatively, upon reaching the individual, the emergency responder may be able to connect a personal device to the sensory unit 100 (e.g., via a transceiver, Bluetooth, or other device 144, or connecting mechanism 153, in the sensory unit 100) and access personal data about the user stored on the device's memory resource 137.

Embodiments of the present invention, as aforementioned, include a wholly integrated sensory unit (e.g., FIG. 1, 100) into a wearable item and/or one or more components that can be attached and/or otherwise enclosed, detachably, to a wearable item. In embodiments of the present invention, various sensors that comprise the sensory unit provide one or more programs executing on a processing device in the unit with data, which the one or more programs analyze to determine whether to provide notifications to an emergency notification system. The sensory unit can be triggered to provide this alert both manually (using a designated switch or button) and/or automatically. Embodiments of the present invention may include an emergency switch or button that can be activated or depressed by a user and/or another trigger for an alarm, which could be triggered by the user, manually. In some embodiments of the present invention, a user/wearer presses and holds an emergency button for a predetermined duration of time (e.g., 3 seconds) to trigger a distress signal. Automatic notifications are triggered when the one or more programs (communicating with various other components of the sensory unit), determine that an impact or collision has occurred and/or if the linear, rotational and/or angular velocity of the wearer is outside of an expected range of values.

Returning to FIG. 1, in embodiments of the present invention, various sensors provide the one or more programs with data that enables the one or more programs to determine that an impact or collision has occurred and/or the wearer's movement and/or physical orientation is outside of an expected range (and therefore likely a safety concern). The one or more programs in some embodiments of the present invention determine that a user/wearer is in a problematic situation (has suffered an impact or collision, is moving in an unexpected manner, or is oriented at an unexpected angle, and likely, in both circumstances, headed for an impact or collision) based on receiving and/or obtaining data from various integrated sensors. These sensors include, but are not limited to, shock and/or pressure sensors, one or more gyroscope (or other rotational sensor), a micro-electric mechanical system (MEMS) to measure angular velocity, and/or a three-axis accelerometer, to monitor the acceleration and positioning of the wearer.

In embodiments of the present invention, one or more programs determine that an impact or collision has occurred, based on obtaining or receiving data from sensors of the sensory unit. In some embodiments of the present invention, the one or more programs may determine that an impact or collision has occurred (or is imminent) based on sudden or rapid changes in speed, motion or velocity, as indicated by the sensors. Conditions indicating an impact or collision that would trigger the one or more programs to transmit a notification include the one or more programs determining that an impact has occurred based on the sensors indicating that a predetermined impact threshold or set of rules have been met. The business rules that indicate whether data from sensors indicate that an impact or collision has occurred may be stored in a memory resource 137 in the sensory unit 100. The one or more programs may also determine that an impact or collision has occurred based on the motion and velocity-related sensors of the sensory unit 100 indicating an abrupt stop or deceleration event, after the shock and/or pressure sensors have indicated an impact.

There are many situations where the data provided by the sensory devices in embodiments of the present invention enables the one or more programs to determine that an impact or collision has occurred. For example, a user of the sensory device 100 may be wearing the device and skiing down a previously enjoyed run (i.e., bumpy or clumpy snow) and lose control and ram into a tree or other object hard enough that the event registers above the shock and pressure sensors provide data to the one or more programs and the one or more programs determine that the impact is above a predetermined threshold. Based on making this determination, the one or more programs transmit a notification. In another example, a user may be skiing down a beautifully groomed run and another skier collides with the user from the side. Based on determining (from data provided by sensors) that the collision or impact itself is above the predetermined threshold, the one or more programs transmit a notification.

In some embodiments of the present invention, once the one or more programs determine that an impact or collision has occurred sufficient to transmit a notification, the one or more programs may delay making the notification until the completion of the event from which the sensor-gathered data originated. For example, the one or more programs may wait a predefined period of time (e.g., 10-20 seconds) and/or until the sensors and location device(s) indicate that the wearer is no longer in motion, to transmit the notification.

In some embodiments of the present invention, the one or more programs may automatically transmit a notification to an emergency notification system, based on determining that a wearer of the sensory unit (e.g., FIG. 1, 100) has experienced a (possibly violent) fall. The one or more programs determine this event has occurred based on receiving data from the sensors and location device(s) indicating sudden or rapid changes in direction and/or angular velocity (measurement of speed of rotation). The one or more programs may automatically transmit the notification (optionally after the grace period) based on the erratic movement alone and/or the one or more programs may transmit the notification after receiving sensor data indicating that the user experienced a fall that registers above a predetermined rotational threshold or set of rules (e.g., in the case that the user is a skier, the user may be violently or erratically tumbling down a trail). One instance in which this aspect of the present invention is useful is when a wearer is skiing down a beautifully groomed run and another skier cuts the wearer off from any direction, causing the wearer to tumble down the mountain (violently). Based on receiving data from one or more of the location device (e.g., FIG. 1, 127), the angular velocity sensor (e.g., FIG. 1, 139), and/or the rotational sensor (e.g., FIG. 1, 115), the one or more programs determine that the rotational forces and/or angular velocities register with abnormal characteristics for skiing/snowboarding (pre-configured motion thresholds and settings), the one or more programs transmit a notification (optionally after a grace period). In some embodiments of the present invention, the one or more programs analyze the duration of time and/or distance of a perceived "tumbling" motion to determine whether to transmit the automatic notification (a certain distance and/or duration may trigger the transmission).

In some embodiments of the present invention, once the one or more programs determine that a fall has occurred sufficient to transmit a notification, the one or more programs may delay making the notification until the completion of the event from which the sensor-gathered data originated. For example, the one or more programs may wait a predefined period of time (e.g., 10-20 seconds) and/or until the sensors and location device(s) indicate that the wearer is no longer in motion, to transmit the notification.

In some embodiments of the present invention, the one or more programs may automatically transmit a notification to an emergency notification system based on the one or more programs determining, based on data collected by the various sensors and devices that comprise the sensory unit indicating that the user is at an unexpected physical orientation. The one or more programs determine, based on the various sensors that indicate the position of the wearer (e.g., FIG. 1, motion sensors 110, rotation sensors 115, angular velocity sensors 139, etc.) that the axial position of the wearer has shifted (e.g., that the user is upside-down). Based on receiving data and determining that the data indicates this positioning, the one or more programs send a notification. In some embodiments of the present invention, the one or more programs send an alert based on positioning of a user only if the user remains at this orientation for a given amount of time (e.g., 20-45 seconds). A circumstance where this could be useful is if a wearer of the sensory unit is a skier and the skier ends up positioned upside down in a tree well (i.e., buried in snow next to a tree) for a predetermined duration of time (e.g., 30 seconds).

In some embodiments of the present invention, once the one or more programs determine that the wearer is at a problematic orientation sufficient to transmit a notification, the one or more programs may delay making the notification until the completion of the event from which the sensor-gathered data originated. For example, the one or more programs may wait a predefined period of time (e.g., 10-20 seconds) and/or until the sensors and location device(s) indicate that the wearer is no longer in motion, to transmit the notification.

In some embodiments of the present invention, a wearer can make a selection that overrides an automatic notification by depressing a button or switch. The user could make this selection during the aforementioned grace period. Rather than making a selection, a user may utilize the audio (e.g., FIG. 1, 140) and/or haptic (e.g., FIG. 1, 142) devices to provide a command to the one or more programs to override the notification (i.e., upon receiving the command, the one or more programs would cancel the notification).

Figure 2:
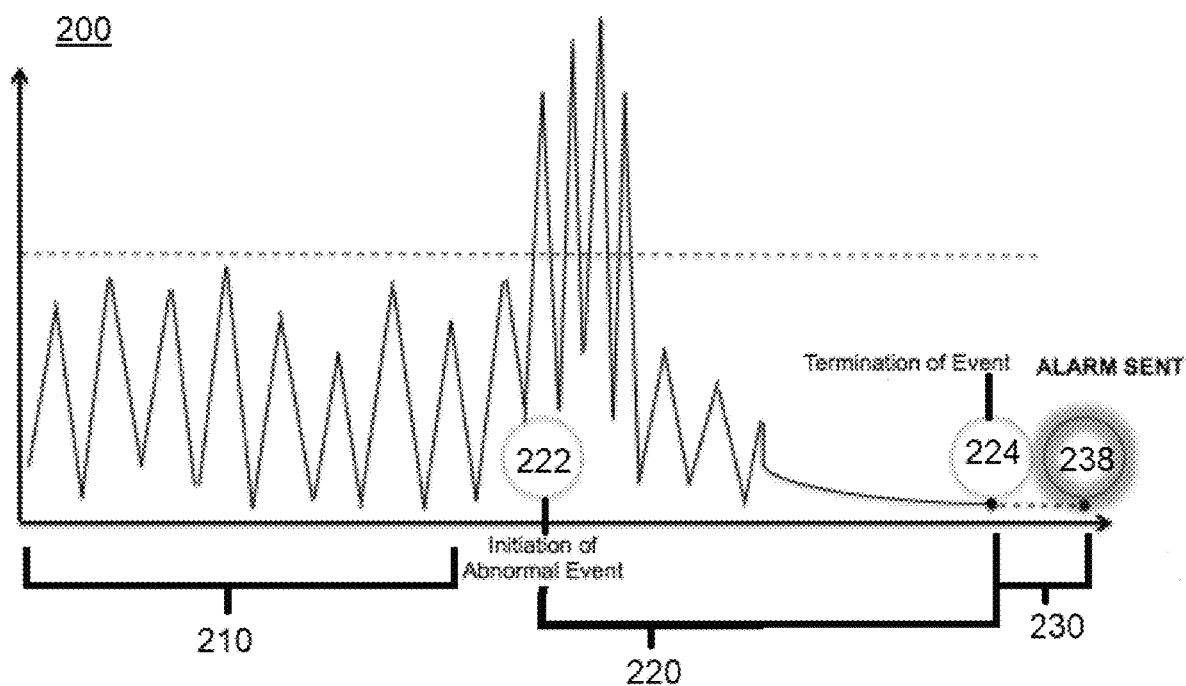
FIG. 2 graphically depicts the functionality of various embodiments of the present invention.

FIG. 2 is a graph 200 that displays activity of a wearer of a sensory unit, before a problematic event 210, during the event 220, including the initiation of the event 222 and the termination of the event 224, when the one or more programs determine that a threshold (or business rule) has been met that would dictate transmission of a notification. The graph also shows a grace period 230, beginning at the termination of the event 224, in which the wearer can either manually override the automatic transmission and/or the one or more programs, which continue to monitor the sensor data, obtain data that indicates a change in circumstance and does not send the notification, In this graph 200, the period to override the notification expires and the one or more programs send the notification 238, which includes location information of the wearer. The experience of the user reflected in FIG. 2 can be experienced by a user wearing a sensory unit (e.g., FIG. 1, 100) that is secured (detachable or permanently) to a garment 393 (FIGS. 3A-3I) in a variety of ways, including but not limited to, those depicted in FIGS. 3A-3I.

Figure 4:
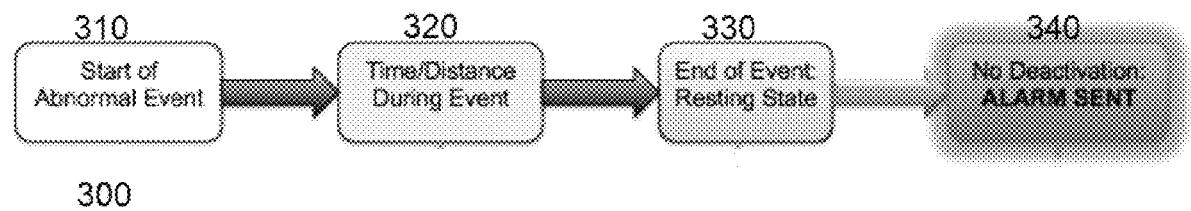
FIG. 4 depicts a workflow that illustrates the functionality of certain embodiments of the present invention.

FIG. 4 is a workflow 300 that includes aspects of some embodiments of the present invention and can be understood in concert with the graph 200 of FIG. 2. In an embodiment of the present invention, the sensors of the sensory unit begin obtaining data that the one or more programs determines the start of an abnormal event (310). To determine whether an abnormal event has occurred (within the defined parameters of a given device) the one or more programs, based on data from sensors and devices of the sensory unit, determine a time and/or distance traveled by a wearer of the device (320). The one or more programs determine whether the event meets a threshold of being an abnormal event (requiring a notification transmission), based on whether this data is outside of a predetermined threshold. In an embodiment of the present invention, the one or more programs continue (through the various sensors and devices) to monitor the motion of the user until the user is at rest (i.e., the abnormal event is complete and the user is at a final location) (330). The end of the event (which has been determined to be abnormal by the one or more programs) is the beginning of the grace period during which the user can override the automatic notification. If: 1) the user does not override the notification (referred to in the workflow as a deactivation), or 2) in some embodiments of the present invention, the one or more programs do not obtain subsequent data from the sensors, based upon which the one or more programs automatically cancel the notification (e.g., indications that the user is moving at a regular linear velocity and has moved a distance from the incident), the one or more programs transmit the notification (e.g., alarm). Thus, as demonstrated broadly in FIG. 4, in embodiments of the present invention, the one or more programs obtain data, including motion-related data, from the various sensors of the sensory unit, the one or more programs analyze the data (e.g., applying preconfigured business rules), to determine if the data represents a problematic (abnormal) event, and the one or more programs transmit a notification after a grace period, provided that during the grace period, there is no manual (or automatic, as discussed earlier) override.

Figure 5:
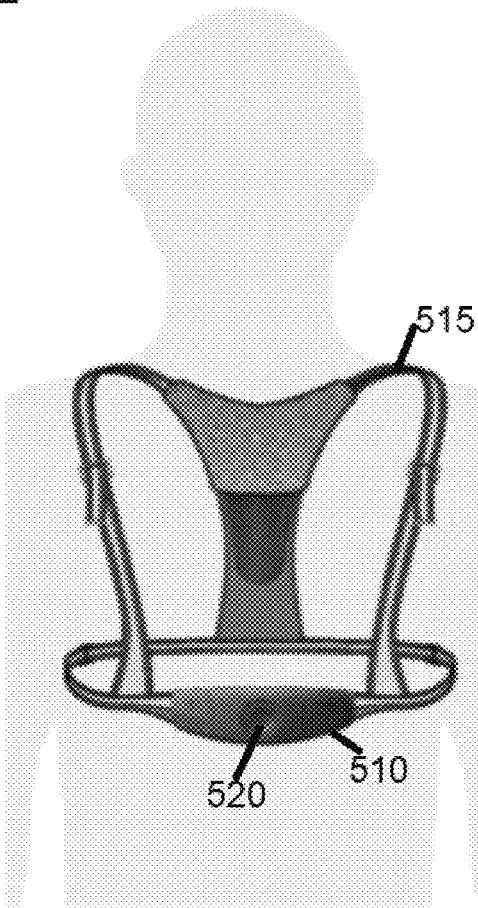
FIG. 5 depicts aspects of an example of a sensory unit utilized in an embodiment of the present invention.

The wearable emergency notification apparatus can be configured in a variety of ways. An example of one embodiment of the present invention can be seen in FIG. 5. In this example, the wearable emergency notification apparatus is configured in a belt/harness-type arrangement, including but not limited to, a sensory unit fastening portion (in this example, a buckle) connected to a thoracic belt and/or shoulder straps. Other embodiments of the present invention can be designed to be worn by a user in any other location or wearable configuration on the user's person. Depending on the configuration of the present invention, a variety of textiles and materials can be utilized in any combination for either the belt/harness, any other wearable configuration and/or the sensory unit fastening portion.

As discussed earlier, the sensory unit of the present invention can be permanently or detachably integrated into a garment. For ease of understanding, these integrations may be referred to as a fixed integration and a removable integration. In some embodiments of the present invention that utilize the fixed integration, the sensory unit may be located internally (inside a garment) or externally (on the outer portion of a garment) and may be sewn into the garment itself or attached by other means so that it cannot be removed from the garment itself. In some embodiments of the present invention that utilize the removable integration, the sensory unit may be located internally (inside a garment) or externally (on the outer portion of a garment) and may be coupled to any garment (ski jacket, athletic shirt, snow pants, etc.) with proprietary attachment mechanisms and/or other known attachment mechanisms. Thus, the entire unit, or just the electronics portion ("buckle"), may be removably coupled to a garment, whether it's posited externally or internally.

Referring to FIGS. 3A-3I and FIG. 6, in an embodiment of the present invention, the sensory unit 200 can be integrated into the clothing of the wearer, for example, it can be passed through a pocket-like lining or sleeve in the user's garment (e.g., ski jacket). In addition to being threaded through a sleeve in a garment, as discussed in FIGS. 3A-3I, the sensory unit may be integrated directly into a garment 393, for example, by being sewn or otherwise affixed into a base layer of a garment, such as a shirt.

Figure 3A:
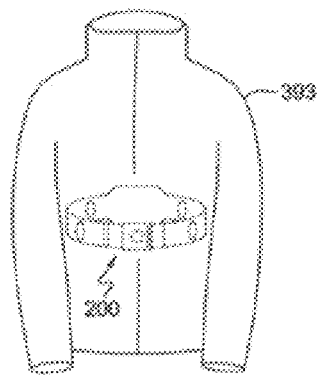
FIGS. 3A-3I depict embodiments of aspects of garments adapted to accommodate an embodiment of a sensory unit in accordance with at least one aspect of the present invention.

As aforementioned, FIGS. 3A-3I depict embodiments of aspects of garments adapted to accommodate a sensory unit 200. FIG. 3A shows the positioning of a sensory unit 200 within a garment 393, which in this example, is a jacket. FIGS. 3A-3I provide some examples of integrations of the sensory unit 200 into clothing. For ease of understanding, in a number of the figures, the garment 393 is labeled consistently. The sensory unit 200 would not be visible (externally) to an individual observing someone wearing this garment 393.

Figure 3B:
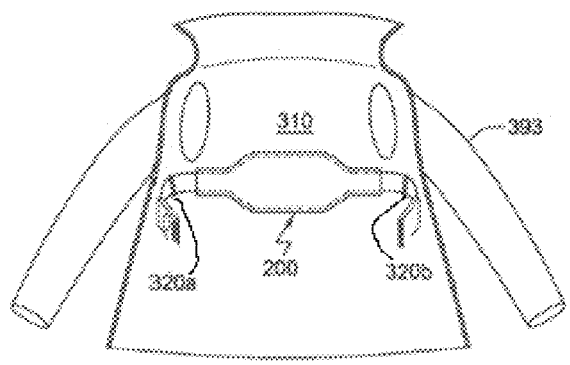

FIG. 3B depicts the same garment 393 as FIG. 3A, but from a different perspective. In FIG. 3B, the garment 393 is shown with the closure open so that the sensory unit 200 is visible. The sensory unit 200 is secured inside the garment 393 with a panel of material 310, which it is threaded through, as well as at least two belt loops 320a-320b.

FIGS. 3C-3I depict different ways of securing the sensory unit within a garment 393.

Figure 3C:
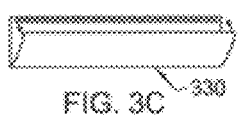

In FIG. 3C, material is folded over the sensory unit 200, and the sleeve 330 is secured at the top, for example, with Velcro.

Figure 3D:
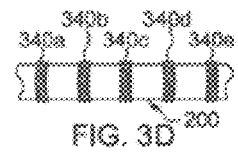

In FIG. 3D, the sensory unit 200 is secured using textile loops 340a-340e, which the sensory unit 200 is threaded through.

Figure 3E:
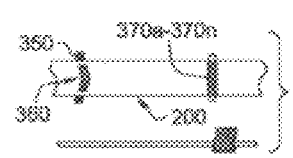

In FIG. 3E, the garment (not pictured) is outfitted with snaps 350 and the sensory unit 200 has at least one strap 360 affixed to it with snaps 370a-370n that will connect with the snaps 350 on the garment.

Figure 3F:
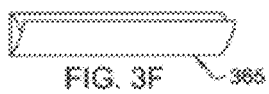

FIG. 3F shows a tri-fold sleeve 365 used to secure the sensory unit 200 within a garment. In some embodiments of the present invention, this sleeve may be secured with Velcro and/or another temporary closure mechanism.

Figure 3G:

FIG. 3G shows the sensory unit 200 being secured inside a garment with a combination of loops 375a-375b and a sleeve 380, which is similar to the sleeve 330 in FIG. 3C.

Figure 3H:
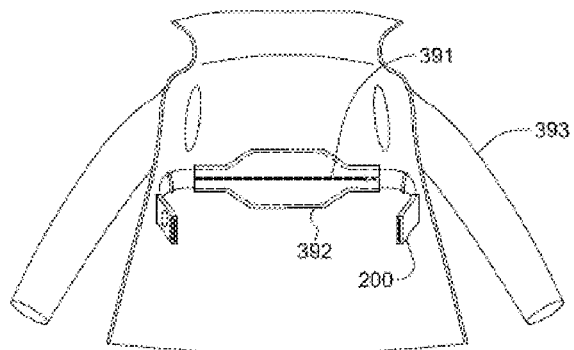
Figure 3I:
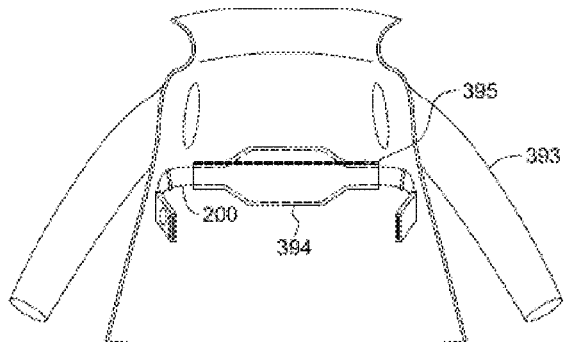

FIG. 3H depicts a sleeve 392 with a zipper 391 oriented horizontally along the center of the sleeve 392, inside a garment 393, securing the sensory unit 200. In another embodiment, FIG. 3I depicts a sleeve 394 similar to the sleeve 392 in FIG. 3H, but, in FIG. 3I, a zipper 395 is oriented at the top of the sleeve 394 where the top of the sensory unit 200 is aligned when inserted into this sleeve 394.

Figure 6:
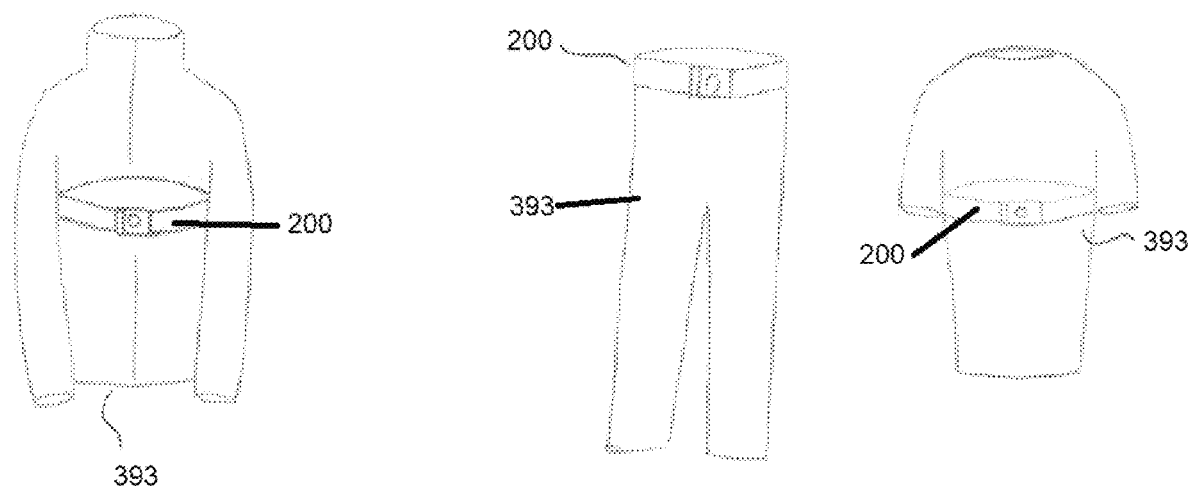
FIG. 6 depicts embodiments of aspects of garments and how embodiments of the present invention are configured to be worn with these garments.

FIG. 6 shows various examples of how a sensory unit 200 can be attached (permanently or detachably) to the outside of a garment 393. The garments are a jacket, pants, and a shirt. These particular garments are not meant as limiting examples and merely demonstrate how a sensory unit 200 in an embodiment of the present invention can be affixed to the outside (or inside, as seen in FIG. 3) of a garment 393.

Returning to FIG. 5, FIG. 5 depicts an embodiment of the present invention where the sensory unit 510, which includes a prominent manual alert button 520, is integrated into a harness 515. The sensory unit 510 fastening portion (e.g., buckle) is connected to a thoracic belt and/or shoulder straps, on a user.

Figure 7:
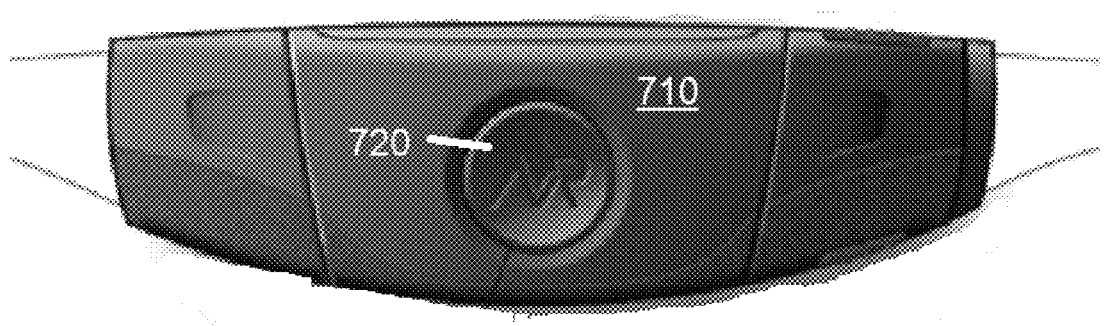
FIG. 7 depicts a view of a sensory unit utilized in an embodiment of the present invention.

FIG. 7 provides a closer view 700 of the outside of a sensory unit 710, which can be integrated into various garments in embodiments of the present invention. The components of the sensory unit (some of which are discussed in FIG. 1), are integrated into this belt buckle embodiment. Again, the manual alert button 720, which can be utilized in some embodiments of the present invention both to activate an alert (cause a notification to occur) and/or to stop an automatic notification from occurring, is located at an easily accessible location. The user may activate a manual notification by depressing this button 720 for a predefined period of time (to avoid a false positive).

Figure 8:
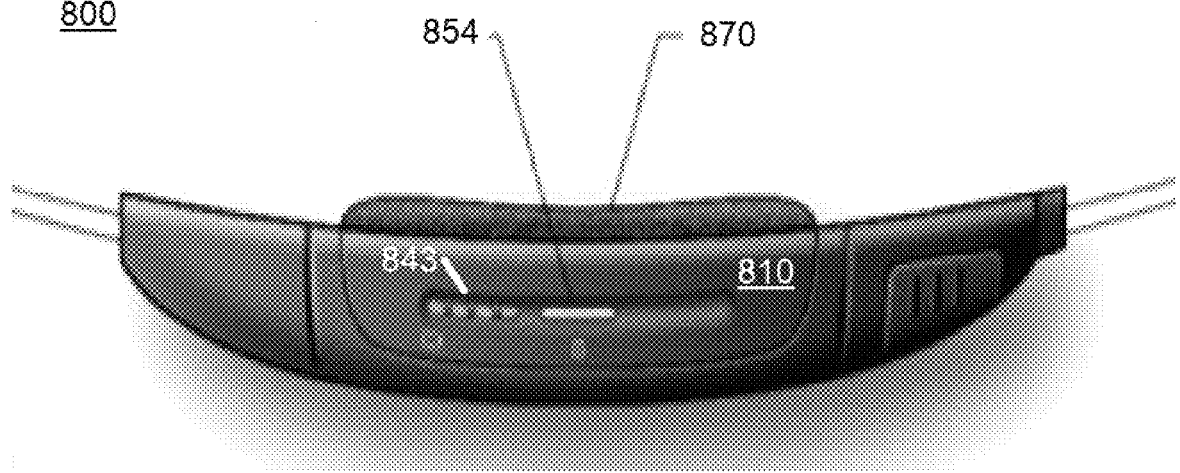
FIG. 8 depicts a view of a sensory unit utilized in an embodiment of the present invention.

FIG. 8 depicts a top view 800 of the sensory unit 810 in some embodiments of the present invention. A display (as discussed in FIG. 1, 120) 843 is depicted at the top of the sensory unit 810 and serves to provide visual indicators to a wearer. This embodiment also includes an on/off push button 854 and other accessible controls. This embodiment also includes some cushioning 870 for comfort of the wearer.

Figure 9:
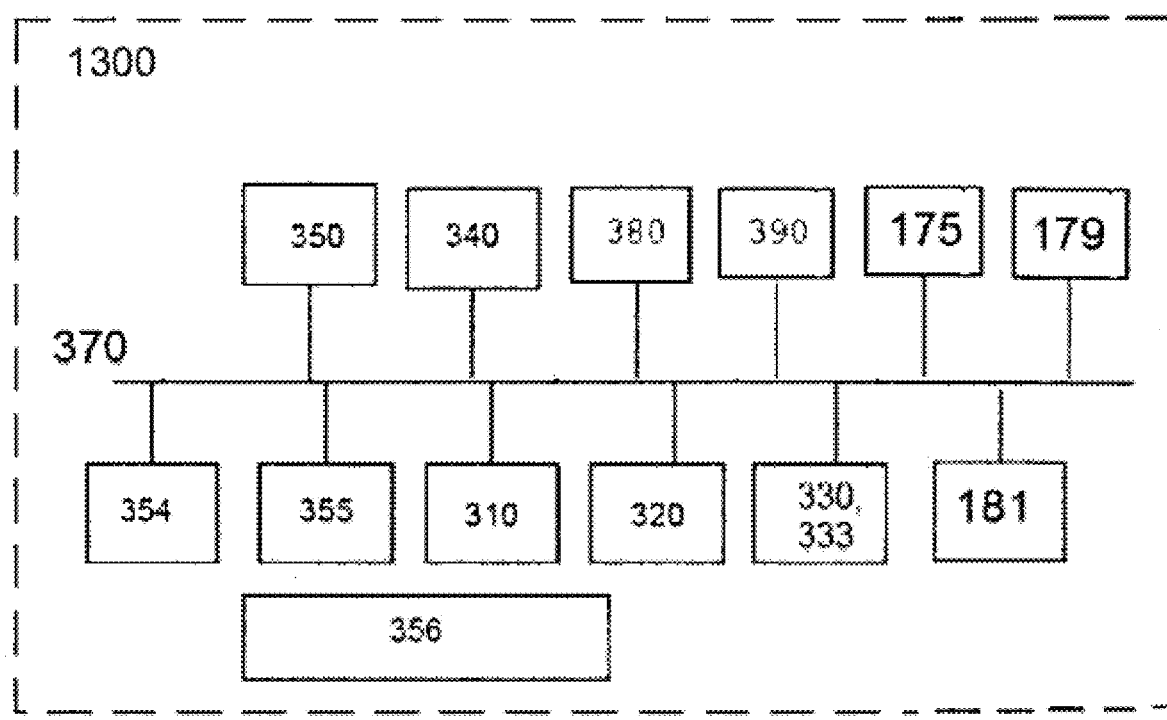
FIG. 9 depicts one embodiment of a single processor computing environment, which may comprise a node of a cloud computing environment, to incorporate and use one or more aspects of the present invention.

FIG. 9 illustrates a block diagram of a resource 1300 in computer system, such as microcontroller 135 (FIG. 1), which is part of the technical architecture of certain embodiments of the present invention. The resource 1300 may include a circuitry 370 that may in certain embodiments include a microprocessor 354. The computer system 1300 may also include a memory 355 (e.g., a volatile memory device), and storage 181. The storage 181 may include a non-volatile memory device (e.g., EPROM, ROM, PROM, RAM, DRAM, SRAM, flash, firmware, programmable logic, etc.), magnetic disk drive, optical disk drive, tape drive, etc. The storage 355 may comprise an internal storage device, an attached storage device and/or a network accessible storage device. The system 1300 may include a program logic 330 including code 333 that may be loaded into the memory 181 and executed by the microprocessor 354 or circuitry 370.

In certain embodiments, the program logic 330 including code 333 may be stored in the storage 181, or memory 355. In certain other embodiments, the program logic 333 may be implemented in the circuitry 370. Therefore, while FIG. 2 shows the program logic 333 separately from the other elements, the program logic 333 may be implemented in the memory 355 and/or the circuitry 370.

Using the processing resources of a resource 1300 to execute software, computer-readable code or instructions, does not limit where this code can be stored.

Figure 10:
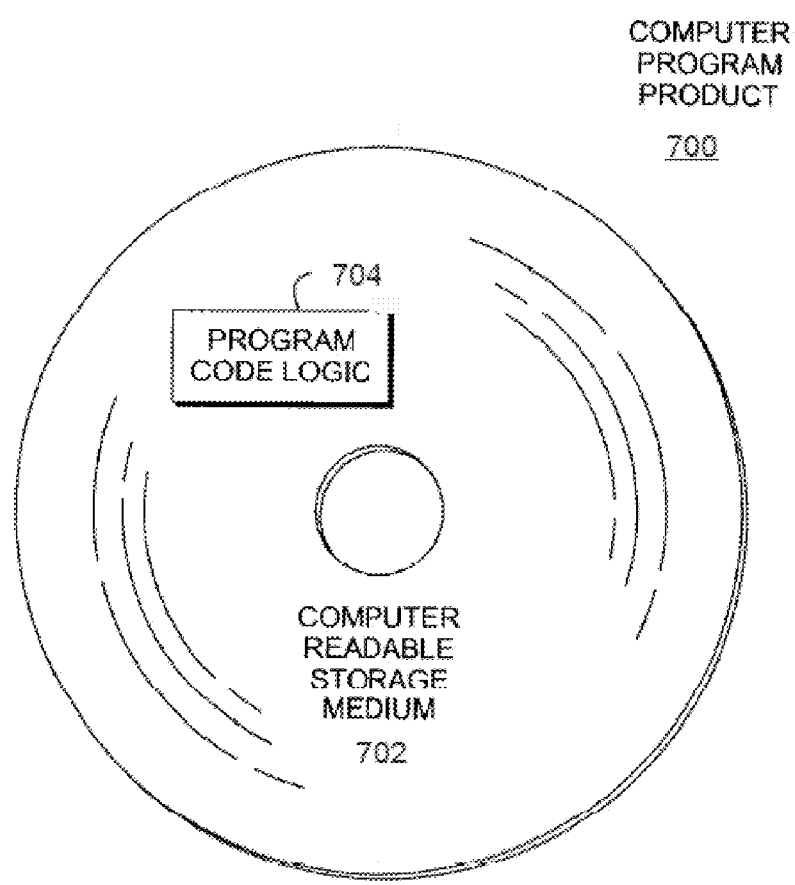
FIG. 10 depicts one embodiment of a computer program product incorporating one or more aspects of the present invention.

Referring to FIG. 10, in one example, a computer program product 700 includes, for instance, one or more non-transitory computer readable storage media 702 to store computer readable program code means or logic 704 thereon to provide and facilitate one or more aspects of the technique.

As will be appreciated by one skilled in the art, aspects of the technique may be embodied as a system, method or computer program product. Accordingly, aspects of the technique may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the technique may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable signal medium may include a propagated data signal with computer readable program code embodied therein, for example, in baseband or as part of a carrier wave. Such a propagated signal may take any of a variety of forms, including, but not limited to, electro-magnetic, optical or any suitable combination thereof. A computer readable signal medium may be any computer readable medium that is not a computer readable storage medium and that can communicate, propagate, or transport a program for use by or in connection with an instruction execution system, apparatus or device.

A computer readable storage medium may be, for example, but not limited to, an electronic, magnetic, optical, electromagnetic, infrared or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Program code embodied on a computer readable medium may be transmitted using an appropriate medium, including but not limited to wireless, wireline, optical fiber cable, RF, etc., or any suitable combination of the foregoing.

Computer program code for carrying out operations for aspects of the technique may be written in any combination of one or more programming languages, including an object oriented programming language, such as Java, Smalltalk, Java, Python, R-Language, C++ or the like, and conventional procedural programming languages, such as the "C" programming language, assembler or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the technique are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions, also referred to as computer program code, may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

In addition to the above, one or more aspects of the technique may be provided, offered, deployed, managed, serviced, etc. by a service provider who offers management of customer environments. For instance, the service provider can create, maintain, support, etc. computer code and/or a computer infrastructure that performs one or more aspects of the technique for one or more customers. In return, the service provider may receive payment from the customer under a subscription and/or fee agreement, as examples. Additionally or alternatively, the service provider may receive payment from the sale of advertising content to one or more third parties.

In one aspect of the technique, an application may be deployed for performing one or more aspects of the technique. As one example, the deploying of an application comprises providing computer infrastructure operable to perform one or more aspects of the technique.

As a further aspect of the technique, a computing infrastructure may be deployed comprising integrating computer readable code into a computing system, in which the code in combination with the computing system is capable of performing one or more aspects of the technique. As a further aspect of the technique, the system can operate in a peer to peer mode where certain system resources, including but not limited to, one or more databases, is/are shared, but the program code executable by one or more processors is loaded locally on each computer (workstation).

As yet a further aspect of the technique, a process for integrating computing infrastructure comprising integrating computer readable code into a computer system may be provided. The computer system comprises a computer readable medium, in which the computer medium comprises one or more aspects of the technique. The code in combination with the computer system is capable of performing one or more aspects of the technique.

Further, other types of computing environments can benefit from one or more aspects of the technique. As an example, an environment may include an emulator (e.g., software or other emulation mechanisms), in which a particular architecture (including, for instance, instruction execution, architected functions, such as address translation, and architected registers) or a subset thereof is emulated (e.g., on a native computer system having a processor and memory). In such an environment, one or more emulation functions of the emulator can implement one or more aspects of the technique, even though a computer executing the emulator may have a different architecture than the capabilities being emulated. As one example, in emulation mode, the specific instruction or operation being emulated is decoded, and an appropriate emulation function is built to implement the individual instruction or operation.

In an emulation environment, a host computer includes, for instance, a memory to store instructions and data; an instruction fetch unit to fetch instructions from memory and to optionally, provide local buffering for the fetched instruction; an instruction decode unit to receive the fetched instructions and to determine the type of instructions that have been fetched; and an instruction execution unit to execute the instructions. Execution may include loading data into a register from memory; storing data back to memory from a register; or performing some type of arithmetic or logical operation, as determined by the decode unit. In one example, each unit is implemented in software. For instance, the operations being performed by the units are implemented as one or more subroutines within emulator software.

Further, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

Embodiments of the present invention may be implemented in cloud computing systems. FIG. 10 may also comprise a node in this type of computing environment.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the descriptions below, if any, are intended to include any structure, material, or act for performing the function in combination with other elements as specifically noted. The description of the technique has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

We claim:

1. A wearable emergency alert apparatus, comprising:
   a memory;
   a processor in communication with the memory;
   a user input device in communication with the processor;
   a plurality of sensors in communication with the processor;
   a location device in communication with the processor;
   a communication device in communication with the processor, wherein the wearable emergency alert apparatus is configured to perform a method, the method comprising:
      obtaining, by the processor, data from a first portion of the plurality of sensors;
      determining, by the processor, that an emergency condition has occurred, wherein the determining is based on a circumstance selected from the group consisting of: applying business rules stored in the memory to the data and determining that the data indicates an emergency condition and receiving specific input via the user input device;
      based on the determining the emergency condition has occurred, obtaining, by the processor, location information from the location device;
      queuing, by the processor, a notification to be sent over a network to a client of an emergency response system, via the communication device, wherein the notification comprises the location information;
      obtaining, by the processor, additional data from a second portion of the plurality of sensors;
      determining, by the processor, based on the additional data, that the wearable emergency alert apparatus is not in motion;
      based on determining that the wearable emergency alert apparatus is not in motion, commencing monitoring the user input device during a predetermined period of time to determine if a specific input is received by the input device during the predetermined period of time;
      based on determining that the specific input is received during the predetermined period of time, cancelling the queued notification; and
      based on determining that the specific input is not received during the predetermined period of time, transmitting the queued notification.

2. The wearable emergency alert apparatus of claim 1, wherein determining that the emergency condition has occurred is based on applying the business rules stored in the memory to the data and determining that the data indicates the emergency condition, and wherein applying the business rules comprises comparing the data to one or more pre-defined thresholds and determining that the data indicates the emergency condition.

3. The wearable emergency alert apparatus of claim 1, wherein the transmitting comprises:
   monitoring, by the processor, the plurality of sensors to obtain the data, wherein the data is related to motion of the wearable emergency alert apparatus;
   determining, by the processor, based on analyzing the data, that the wearable emergency alert apparatus is not moving at a given instance subsequent to commencing the emergency condition; and
   commencing, by the processor, the monitoring the user input device during the predetermined period of time, subsequent to the given instance.

4. The wearable emergency alert apparatus of claim 1, wherein the emergency condition is selected from the group consisting of: a collision, an impact, erratic movement, and an unexpected physical orientation.

5. The wearable emergency alert apparatus of claim 1, wherein the one or more pre-defined thresholds are stored in the memory.

6. The wearable emergency alert apparatus of claim 1, wherein monitoring the user input device during a predetermined period comprises:
   clocking, by the processor, the pre-defined period of time.

7. The wearable emergency alert apparatus of claim 1, wherein a sensor of the plurality of sensors comprises a heat sensor, and wherein the method further comprises:
   prior to obtaining the data from the portion of the plurality of sensors, intermittently polling, by the processor, the heat sensor, to determine whether a reading of the heat sensor meets a minimum value threshold; and
   based on determining that the reading of the heat sensor meets the minimum value threshold, commencing obtaining data from the portion of the plurality of sensors.

8. The wearable emergency alert apparatus of claim 7, wherein the heat sensor is positioned at a distance from the wearer wherein the heat sensor obtains a temperature reading from the wearer, based on a body temperature of the wearer.

9. The wearable emergency alert apparatus of claim 1, wherein the communication device comprises a transponder and a receiver.

10. The wearable emergency alert apparatus of claim 1, wherein the memory, the processor, the user input device, the plurality of sensors, the location device, and the communication device comprise a fastening portion of a garment and fastening the portion initiates the method.

11. The wearable emergency alert apparatus of claim 1, wherein the wearable emergency alert apparatus comprises a garment portion and a component portion, wherein the component portion is detachably or permanently affixed to the garment portion, wherein the component portion comprises the memory, the processor, the user input device, the plurality of sensors, the location device, and the communication device.

12. The wearable emergency alert apparatus of claim 11, wherein the component portion is affixed to an inside portion or an outside portion of the garment portion.

13. The wearable emergency alert apparatus of claim 11, wherein the garment portion is selected from the group consisting of: a belt, a harness, a shirt, a jacket, glove, sock, shorts, hat and pants.

14. The wearable emergency alert apparatus of claim 1, wherein the memory is configured to store identification information related to the user and the wearable emergency alert apparatus, wherein transmitting the queued notification further comprises:
   obtaining, by the processor, the identification information; and
   transmitting, by the processor, the identification information in the notification with the location information.

15. The wearable emergency alert apparatus of claim 14, wherein the identification information comprises a unique identifier.

16. The wearable emergency alert apparatus of claim 1, wherein certain sensors of the plurality of sensors comprise biometric monitors, and wherein transmitting the queued notification further comprises:
   obtaining, by the processor, biometric data from the biometric monitors; and
   transmitting, by the processor, the biometric data in the notification with the location information.

17. The wearable emergency alert apparatus of claim 1, wherein the user input device is selected from the group consisting of: a haptic device, an audio device, a switch, and a button.

18. The wearable emergency alert apparatus of claim 1, wherein the location device comprises at least one of: a GPS device, or an accelerometer.

19. The wearable emergency alert apparatus of claim 1, wherein each sensor of the plurality of sensors is selected from the group consisting of: a motion sensor, a shock sensor, a pressure sensor, an angular velocity sensor, a positional sensor, and a rotational sensor.

* * * * *

UNITED STATES PATENT AND TRADEMARK OFFICE
CERTIFICATE OF CORRECTION

PATENT NO. : 10,957,183 B2
APPLICATION NO. : 16/556821
DATED : March 23, 2021
INVENTOR(S) : Cholhan et al.

Page 1 of 1

It is certified that error appears in the above-identified patent and that said Letters Patent is hereby corrected as shown below:

In the Claims

Column 20, Line 26: Claim 3, Delete "claim 1" and insert -- claim 2 --

Column 20, Line 38: Claim 4, Delete "claim 1" and insert -- claim 2 --

Column 20, Line 42: Claim 5, Delete "claim 1" and insert -- claim 2 --

Signed and Sealed this
Eleventh Day of May, 2021

Drew Hirshfeld
*Performing the Functions and Duties of the*
*Under Secretary of Commerce for Intellectual Property and*
*Director of the United States Patent and Trademark Office*